United States Patent
Miyahara et al.

(10) Patent No.: US 12,535,020 B2
(45) Date of Patent: Jan. 27, 2026

(54) SLIDING MEMBER

(71) Applicant: KABUSHIKI KAISHA RIKEN, Tokyo (JP)

(72) Inventors: Hiroyuki Miyahara, Kumagaya (JP); Masashi Kondo, Kumagaya (JP); Noriyoshi Maruyama, Kumagaya (JP); Ikurou Takahashi, Kumagaya (JP)

(*) Notice: Subject to any disclaimer, the term of this patent is extended or adjusted under 35 U.S.C. 154(b) by 0 days.

(21) Appl. No.: 18/729,539

(22) PCT Filed: Nov. 18, 2022

(86) PCT No.: PCT/JP2022/042896
§ 371 (c)(1),
(2) Date: Jul. 17, 2024

(87) PCT Pub. No.: WO2023/139909
PCT Pub. Date: Jul. 27, 2023

(65) Prior Publication Data
US 2025/0092806 A1 Mar. 20, 2025

(30) Foreign Application Priority Data

Jan. 19, 2022 (JP) ................................. 2022-006245

(51) Int. Cl.
*F01L 1/46* (2006.01)
(52) U.S. Cl.
CPC ...................................... *F01L 1/46* (2013.01)
(58) Field of Classification Search
CPC ........................................................ F01L 1/46
See application file for complete search history.

(56) References Cited

U.S. PATENT DOCUMENTS

| 2005/0284434 A1 | 12/2005 | Tsuruta et al. |
| 2006/0117947 A1 | 6/2006 | Tabata et al. |
| 2022/0042425 A1 | 2/2022 | Takahashi |

FOREIGN PATENT DOCUMENTS

| CN | 1782358 | 6/2006 |
| JP | 2004-278705 | 10/2004 |
| JP | 2006-009080 | 1/2006 |
| JP | 2011-256716 | 12/2011 |

(Continued)

OTHER PUBLICATIONS

Machine generated translation of Description of JP2011256716A obtained from Espacenet.*

(Continued)

*Primary Examiner* — Ngoc T Nguyen
(74) *Attorney, Agent, or Firm* — SHIPWAY IP

(57) ABSTRACT

A sliding member according to the present invention is used in presence of lubricant oil, and includes a sliding surface made of a base material, and a recessed portion provided in the sliding surface, wherein the sliding surface satisfies a condition expressed by following Equation.

$$2 \leq \alpha/Ra \leq 100$$

In Equation, $\alpha$ represents a ratio of a total volume of the recessed portion on the sliding surface to an area of a portion of the sliding surface in which the recessed portion is not formed, and Ra represents a center line average roughness of the sliding surface in the portion in which the recessed portion is not formed.

8 Claims, 6 Drawing Sheets

(56) References Cited

FOREIGN PATENT DOCUMENTS

| | | |
|---|---|---|
| JP | 2017-053469 | 3/2017 |
| JP | 2018-194006 | 12/2018 |
| JP | 2020-176550 | 10/2020 |

OTHER PUBLICATIONS

Machine generated translation of Description of JP2020176550A obtained from Espacenet.*
Machine generated translation of Description of JP2017053469A obtained from Espacenet.*
International Search Report dated Jan. 31, 2023 for PCT/JP2022/042896.
International Preliminary Report on Patentability with Written Opinion dated Aug. 2, 2024 for PCT/JP2022/042896.
Extended Search Report in corresponding European Application No. 22922060.3, dated Oct. 29, 2025.

* cited by examiner

SLIDING MEMBER

CROSS-REFERENCE TO RELATED APPLICATIONS

This application is a 35 U.S.C. § 371 national phase application of PCT/JP2022/042896, filed on Nov. 18, 2022, which claims priority to Japanese Patent Application No. 2022-006245, filed on Jan. 19, 2022.

TECHNICAL FIELD

The present disclosure relates to sliding members used in the presence of lubricant oil.

BACKGROUND ART

A sliding member such as a valve lifter is used in a valve drive mechanism included in an internal combustion engine. The valve lifter is in sliding contact with an outer peripheral surface of a cam of a camshaft, and uses rotation of the camshaft to open and close a valve. Conventionally, various efforts have been made to reduce sliding resistance in sliding members. For example, Patent Literature 1 discloses a sliding member of which a sliding surface is subjected to diamond-like carbon treatment and in which a plurality of minute recessed portions are formed. Patent Literature 2 discloses a sliding member having a hard carbon film that serves as a sliding surface and a recessed portion in which a depth distribution changes from the center to an end portion in a direction perpendicular to a sliding direction on the sliding surface according to an oil film thickness distribution.

CITATION LIST

Patent Literature

[Patent Literature 1] Japanese Unexamined Patent Publication No. 2006-9080
[Patent Literature 2] Japanese Unexamined Patent Publication No. 2004-278705

SUMMARY OF INVENTION

Technical Problem

However, since conventional sliding members are equipped with a hard film such as that of diamond-like carbon, they have excellent wear resistance and a good friction reduction effect in a fluid lubrication region, but at low sliding speeds (under high loads) such as in a boundary lubrication region, a coefficient of friction is higher than in the fluid lubrication region, and there is room for improvement.

The present disclosure provides a sliding member in which a diamond-like carbon film is not provided on a sliding surface, and which can achieve an excellent friction reduction effect under conditions in which a sliding speed is relatively low.

Solution to Problem

A sliding member according to the present disclosure is a sliding member used in presence of lubricant oil, and includes a sliding surface made of a base material, and a recessed portion provided in the sliding surface, wherein the sliding surface satisfies a condition expressed by following Equation.

$$2 \leq \alpha/Ra \leq 100$$

In Equation, $\alpha$ represents a ratio of a total volume of the recessed portion on the sliding surface to an area of a portion of the sliding surface in which the recessed portion is not formed, and Ra represents a center line average roughness of the sliding surface in the portion in which the recessed portion is not formed.

As described above, the fact that the sliding surface is made of a base material means that no hard film is formed on the sliding surface. Examples of the hard film include a diamond-like carbon film, an ion plating film, and a hard plating. When such a sliding surface satisfies the above conditions, an excellent friction reduction effect can be achieved under conditions in which a sliding speed is relatively low. Due to a pump effect in which a portion of the base material around a recessed portion that does not have the hard film formed on the sliding surface is elastically deformed and pushes out lubricant oil in the groove, and a wedge effect that introduces lubricant oil between the sliding surface and a counterpart member, an amount of oil film supplied in a sliding direction of a pressure generation region increases, a lubrication state between the sliding members approaches a fluid lubrication state, and a friction reduction effect is exerted.

A shape of the recessed portion on the sliding surface is, for example, a groove (an elongated recessed portion). In plan view, when a length of the groove is L and an average width of the groove is W, a ratio L/W of the length L to the average width W is preferably 2 or more. The groove may extend linearly or may have a spiral shape. The recessed portion may be a plurality of grooves that extend radially or a plurality of concentric grooves. When the shape of the recessed portion is a spiral groove or a plurality of concentric grooves, the counterpart member is averagely influenced by the recessed portion on the sliding surface during sliding, and a friction reduction effect can be achieved more effectively. The average width W of the groove depends on a length of the groove, but refers to an average value obtained by measuring widths at multiple locations (for example, 5 locations) equally spaced in an extending direction of the groove.

When the average width of the groove is W and an average depth of the groove is D, a ratio W/D of the average width W to the average depth D is preferably larger than 1. A sufficient amount of lubricant oil can be stored by meeting such conditions, and also a sufficient amount of lubricant oil can be supplied to a portion in which the recessed portion is not formed by sweeping out the lubricant oil accumulated during sliding from the recessed portion. The average depth D of the groove depends on the length of the groove, but refers to an average value obtained by measuring the depth at multiple locations (for example, 5 locations) equally spaced in the extending direction of the groove.

The sliding member in the present disclosure may be used in an environment in which a relative sliding speed with respect to a counterpart member is 1.4 m/s or less. When the sliding member of the present disclosure is used in the above environment, the friction reduction effect can be achieved more effectively than when the sliding member is used in an environment in which the relative sliding speed with respect to the mating member exceeds 1.4 m/s.

Advantageous Effects of Invention

According to the present disclosure, there is provided a sliding member in which a diamond-like carbon film is not provided on a sliding surface and which can achieve an excellent friction reduction effect under conditions in which a sliding speed is relatively low.

DESCRIPTION OF EMBODIMENTS

Figure 1A:
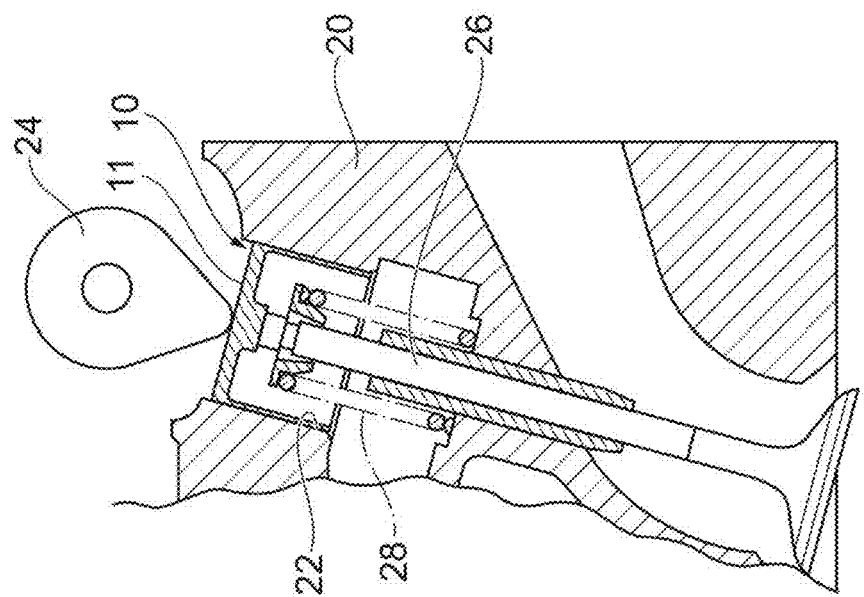
FIGS. 1A and 1B are cross-sectional views showing a part of a valve mechanism of an internal combustion engine to which a sliding member according to an embodiment of the present disclosure is applied.

Embodiments of the present disclosure will be described in detail below with reference to the accompanying drawings. In addition, in the description of the drawings, the same elements are designated by the same reference numerals, and redundant descriptions thereof will be omitted.

<Valve Mechanism>

Figure 1B:
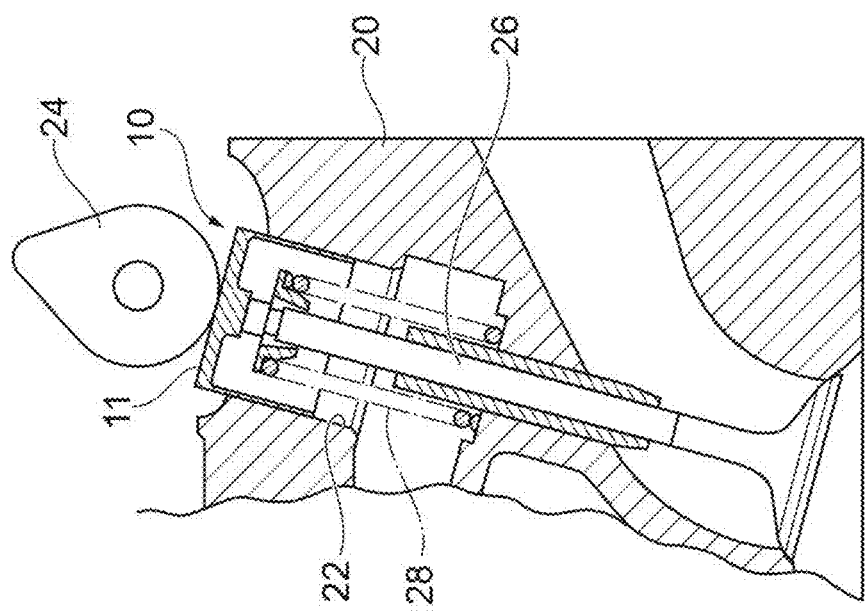

FIG. 1 shows a part of a valve mechanism of an internal combustion engine to which a sliding member according to an embodiment of the present disclosure is applied. FIG. 1A is a cross-sectional view showing a state in which the valve lifter is raised and the valve is closed, and FIG. 1B is a cross-sectional view showing a state in which the valve lifter is lowered and the valve is open.

A valve lifter 10 shown in FIG. 1A corresponds to the sliding member according to this embodiment, and is provided in a bore 22 of a cylinder head 20. A cam 24 is a counterpart member for the sliding surface 11 of the valve lifter 10. The cam 24 is mounted on a camshaft and is rotated as the camshaft is rotated by a drive system or the like. Since the cam 24 has a cam profile in which a distance from a center of rotation to an outer peripheral sliding surface is not constant, a force pushing the sliding surface 11 of the valve lifter 10 changes as the cam 24 rotates. As shown in FIGS. 1A and 1B, as the cam 24 rotates, the valve lifter 10 moves within the bore 22, and a valve 26 connected to the valve lifter 10 is opened and closed. The valve 26 is always biased upward (toward the cam side) in the drawing by a valve spring 28 disposed on the outer periphery. An opening operation of the valve 26 (refer to FIG. 1B) is performed when a protruding portion of the cam 24 presses the sliding surface 11. Lubricant oil is supplied from a lubricant oil supply means (not shown) provided on the camshaft side, and the cam 24 and the valve lifter 10 are lubricated. A force with which the cam 24 presses the valve lifter 10 becomes a maximum when a protruding tip (a cam nose) of the cam 24 reaches near a center region of the sliding surface 11. As a rotational speed of the camshaft increases, a sliding speed with respect to the valve lifter 10 also increases.

<Valve Lifter>

Figure 2:
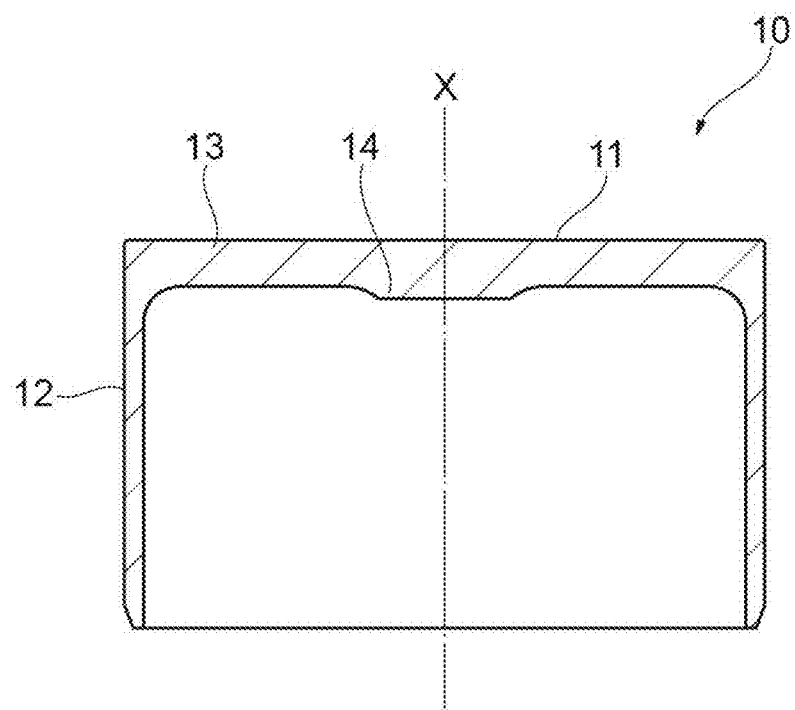
FIG. 2 is a cross-sectional view showing a valve lifter shown in FIG. 1.
Figure 3:
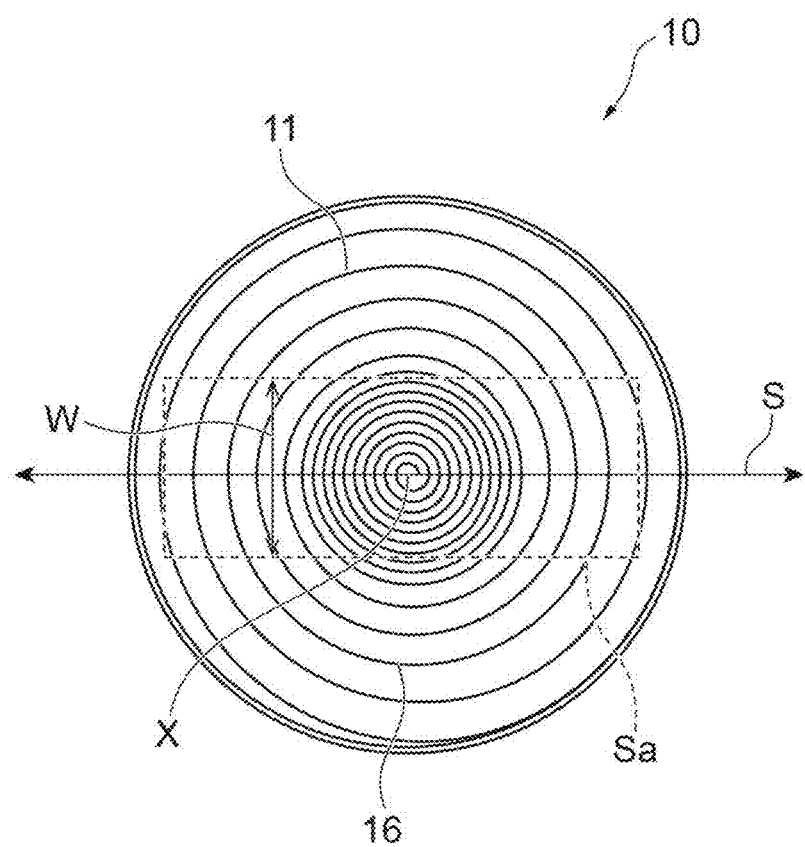
FIG. 3 is a top view schematically showing one aspect of a groove formed in a sliding surface of the valve lifter.

FIG. 2 is a cross-sectional view of the valve lifter 10, and FIG. 3 is a top view of the valve lifter 10. As shown in the drawing, the valve lifter 10 has a cylindrical shape with one end open, and specifically, has a cylindrical skirt portion 12 and a crown portion 13 that is integrally formed with the skirt portion 12 at an upper end portion that is one end side of the skirt portion 12 in a direction of a central axis X. A circular boss portion 14 is provided near a center of a lower surface (a principal surface on the skirt portion 12 side) of the crown portion 13. The boss portion 14 is in contact with an upper end (a valve stem) of the valve 26. A tapered chamfer is formed at a boundary between the skirt portion 12 and the sliding surface 11.

The sliding surface 11 may have a circular shape, for example, as shown in FIG. 3. When the sliding surface has a circular shape, the cam 24 slides in a part of a region (a sliding range Sa shown by a broken line in FIG. 3) in a direction of an arrow S shown in FIG. 3. That is, the arrow S indicates a sliding direction of the cam 24, and a contact point between the cam 24 that rotates in one direction and the sliding surface 11 reciprocates in the direction along the arrow S. The sliding range Sa indicated by a broken line indicates a moving range of the cam 24 that slides along the arrow S. In order to rotate the valve lifter 10 about a central axis thereof within the bore 22 when sliding with the cam 24, a center position of a cam width may be slightly offset to the outer periphery side from a central axis of a crown surface of the valve lifter, and the sliding range Sa of the cam may be made slightly larger than the cam width in consideration of offset. The sliding surface 11 means a region with which the cam 24 can come into contact.

A main body portion (the sliding surface 11, the skirt portion 12, the crown portion 13, and the boss portion 14) of the valve lifter 10 is made of a base material. A material of the base material is not particularly limited, but for example, a heat-treated steel material can be used, and a steel material that has been treated with carburizing, nitriding, sulfurizing, or the like may also be used.

The valve lifter 10 is used in the presence of lubricant oil. For example, engine oil can be used as the lubricant oil. When applied to parts other than internal combustion engine parts, for example, lubricant oil such as machine oil, grease, or the like can be used as the lubricant oil.

The lubricant oil may also contain an additive. The additive is not particularly limited, but it is preferable to use one containing at least one element selected from molybdenum, phosphorus, sulfur, zinc, and calcium. When the additive contains at least one element from molybdenum, phosphorus, sulfur, zinc, and calcium, a tribo-film tends to be formed between the sliding surface and the counterpart member during sliding, making it easier to achieve a friction reduction effect. The tribo-film is produced by the additives contained in the lubricant oil being adsorbed to the base material on the sliding surface, the temperature and pressure generated by the sliding acting as a driving force, and causing components of the base material and the additive to react. More preferably, the additive contains one or more elements from molybdenum, phosphorus, sulfur, and calcium.

As shown in FIG. 3, a groove 16 (a recessed portion) is provided in the sliding surface 11. The groove 16 has a spiral shape centered on the central axis X (hereinafter, simply referred to as an "axis X") of the sliding surface 11, and is continuously formed from an end portion of the sliding surface 11 on the outer periphery side to an end portion (near the axis X) of a center portion. The groove 16 can be formed by irradiating the sliding surface 11 with a laser. For example, while the valve lifter before the groove 16 is formed is rotated about the axis X, a laser is radiated in a radial direction from the outer periphery side of the sliding surface 11 toward the center portion. At this time, the groove 16 shown in FIG. 3 can be formed by controlling a rotational speed of the valve lifter, a moving speed of the laser, a radiation intensity of the laser, and the like. The laser that can be used includes an ultrashort pulse laser and a linearly polarized laser. Among them, it is preferable to use an ultrashort pulse laser with a pulse interval of picoseconds to femtoseconds as the laser for forming the groove 16.

The sliding surface 11 satisfies the conditions expressed by the following Equation.

$$2 \le \alpha/Ra \le 100$$

α represents a ratio of a total volume of the groove 16 in the sliding surface 11 to an area of a portion of the sliding surface 11 in which the groove 16 is not formed (a total volume of the recessed portion/an area of a portion in which the recessed portion is not formed), and Ra represents a center line average roughness in the portion of the sliding surface 11 in which the groove 16 is not formed.

The area of the portion of the sliding surface 11 in which the groove 16 is not formed can be calculated by measuring, for example, using a surface roughness/contour measuring machine (SURFCOM 1400D manufactured by Tokyo Seimitsu) in accordance with JIS B 0601-2001. Alternatively, the area may be determined by image processing. The measurement conditions include, for example, a cutoff value of 0.25 mm, an evaluation length of 1.25 mm, a measurement speed of 0.3 mm/s, and a 60-degree conical stylus with a tip radius of 2 μm. The area of the portion of the sliding surface 11 in which the groove 16 is formed can also be calculated by measuring, for example, using a surface roughness/contour measuring machine (SURFCOM1400D manufactured by Tokyo Seimitsu) in accordance with JIS B 601-2001. Alternatively, the area may be determined by image processing.

In plan view, when a length of the groove 16 is L and an average width of the groove 16 is W, a ratio L/W of the length L to the average width W is preferably 2 or more. The average width W of the groove 16 can be measured, for example, using a surface roughness/contour measuring machine (SURFCOM1400D manufactured by Tokyo Seimitsu). Alternatively, the average width may be determined by image processing.

When the average width of the groove 16 is W and an average depth of the groove 16 is D, a ratio W/D of the average width W to the average depth D is preferably larger than 1, and more preferably 10 or more. The average depth D of the groove 16 can be measured, for example, using a surface roughness/contour measuring machine (SURFCOM1400D manufactured by Tokyo Seimitsu). When a value of W/D is greater than 1, the lubricant oil in the groove 16 is easily supplied to the sliding surface, and on the other hand, when it is 500 or less, the area of the portion of the sliding surface 11 in which the groove 16 is not formed can be readily ensured. When the groove 16 is formed by laser processing, a depth of the groove 16 is, for example, 100 to 400 nm.

A volume of the groove 16 in the sliding surface 11 can be calculated from, for example, the average depth of the groove 16 and the area of the sliding surface 11 in which the groove 16 is formed, by measuring using a surface roughness/contour measuring machine (SURFCOM1800D manufactured by Tokyo Seimitsu).

The center line average roughness of the portion of the sliding surface 11 in which the groove 16 is not formed is expressed as a center line average roughness (Ra) determined by JISB-0601. Ra is obtained by analyzing a surface profile measured for an evaluation length of 4 μm using an atomic force microscope. The center line average roughness Ra of the portion of the sliding surface 11 in which the recessed portion is not formed may be, for example, 0.5 μm or less.

A value of α/Ra on the sliding surface 11 is, for example, 2 to 100, and may be 2 to 50 or 2 to 10. When the value of α/Ra is 2 or more, resistance due to surface roughness of the sliding surface 11 is curbed, or a pump effect that pushes out the lubricant oil and a wedge effect adjust an amount of lubricant oil supplied to the portion of the sliding surface 11 in which the recessed portion is not formed, resulting in effects such as achieving an excellent friction reduction effect. Further, when the value of α/Ra is 100 or less, it is possible to prevent an excessive amount of lubricant oil from being supplied to the portion of the sliding surface 11 in which the groove 16 is not formed, and to curb an increase in sliding resistance caused by the lubricant oil.

The valve lifter 10 may be used in an environment in which a relative sliding speed with respect to a counterpart member is 1.4 m/s or less. When the valve lifter 10 is used in the above environment, the friction reduction effect can be achieved more effectively than when the valve lifter 10 is used in an environment in which the relative sliding speed with respect to the counterpart member exceeds 1.4 m/s.

A cross-sectional shape of the groove 16 is not particularly limited. For example, a side surface and a bottom surface may be a continuous curved shape, or the side surface and the bottom surface may be clearly distinguished from each other. Furthermore, the inside of the groove 16 may have a so-called V-groove shape formed on two surfaces.

Figure 4:
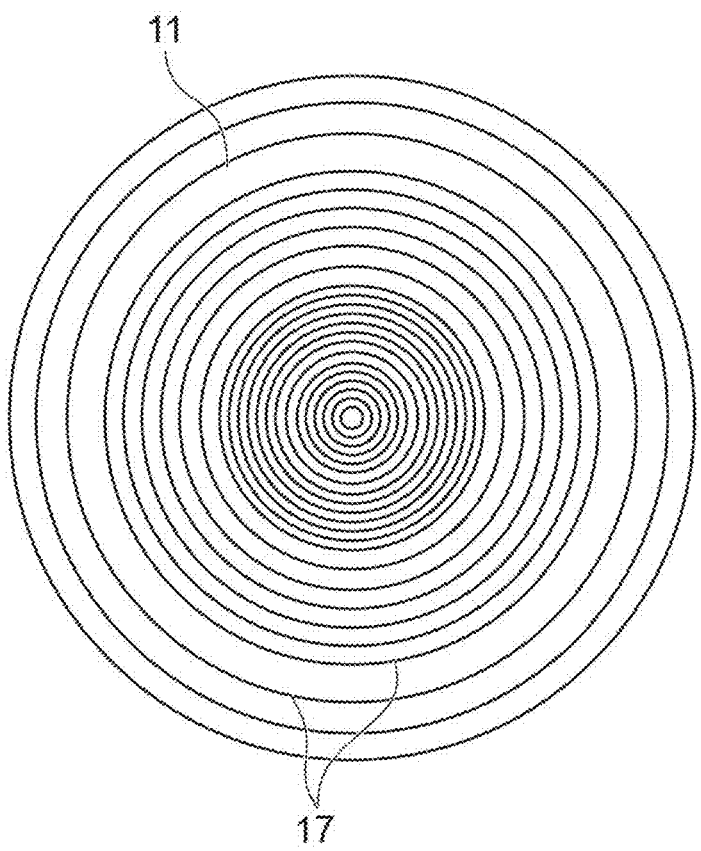
FIG. 4 is a top view of the valve lifter schematically showing another aspect of the groove.
Figure 5:
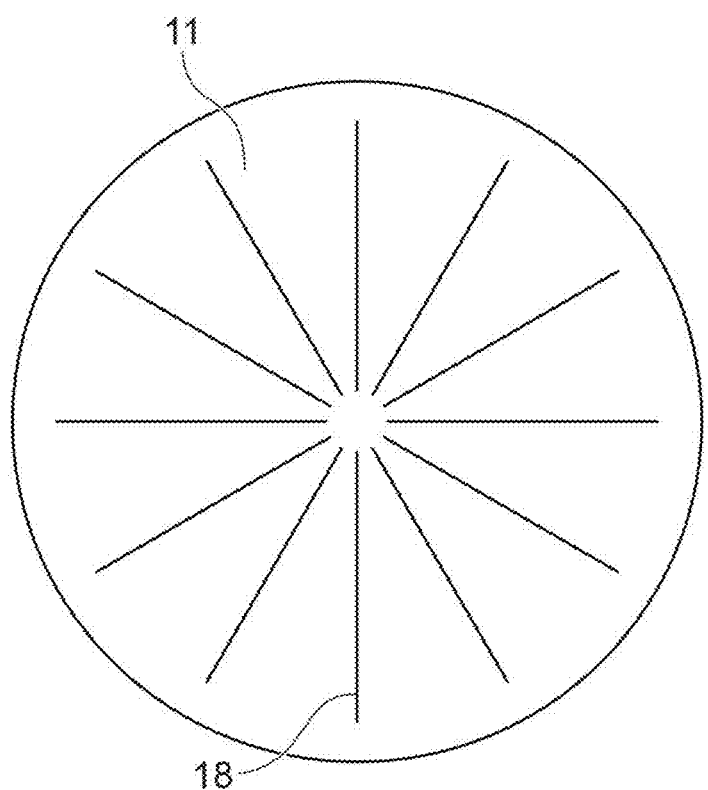
FIG. 5 is a top view of the valve lifter schematically showing another aspect of the groove.

Although the embodiments of the present disclosure have been described in detail above, the present invention is not limited to the above embodiments. For example, in the above embodiment, although the spiral groove 16 is continuously formed from one end portion to the other end portion, as long as the value of α/Ra on the sliding surface 11 is within a range of 2 to 100, the groove 16 may be formed intermittently. Furthermore, a shape of the recessed portion does not have to be spiral, and for example, as shown in FIG. 4, a plurality of concentric grooves 17 may be formed in the sliding surface 11. A plurality of annular grooves 17 may also be formed continuously in a circumferential direction, or may be formed intermittently. As shown in FIG. 5, a plurality of linear grooves 18 may be formed in the sliding surface 11. The plurality of linear grooves 18 may also be formed continuously or intermittently.

In the above embodiment, although the valve lifter is illustrated as an example of the sliding member, the sliding member according to the present disclosure may also be applied to sliding parts of valve mechanism parts such as shims, rocker arms, and finger followers, or sliding parts of gears, bearings, and the like.

EXAMPLES

The present invention will be described below on the basis of examples. The present invention is not limited to the following examples.

Example 1

A valve lifter having a sliding surface similar to that shown in FIG. 3 was manufactured. The aspects of the valve lifter according to this embodiment are as follows.
Valve lifter material: SCM420
Diameter of sliding surface: 28.5 mm
Groove type: Continuous spiral shape
Average groove depth D: 0.254 μm
Average groove width W: 105 μm
Area A of a portion of the sliding surface in which a recessed portion is not formed: 432.34 mm$^2$
Total volume of the recessed portion on the sliding surface V: 0.032 mm$^3$
Ratio of a total volume V (unit: mm$^3$) of the recessed portion on the sliding surface to an area A (unit: mm$^2$) of the portion of the sliding surface in which a recessed portion is not formed (α=V/A): 0.074 μm
Center line average roughness (Ra) of the portion of the sliding surface in which a recessed portion is not formed: 0.024 μm
α/Ra: 3.1
Groove processing method: Laser processing

Examples 2 to 5, Comparative Examples 1 to 2

Valve lifters of Examples 2 to 5 and Comparative examples 1 to 2 were manufactured in the same manner as in Example 1, except that the average depth of the groove in the sliding surface, the average width of the groove, the area of the portion of the sliding surface in which the recessed portion is not formed, the total volume of the recessed portion in the sliding surface, and Ra were changed as shown in Table 1 below.

Comparative Examples 3 to 5

Valve lifters of Comparative examples 3 to 5 were manufactured in the same manner as in Example 1, except that the diamond-like carbon film was provided on the sliding surface. Measurement results are shown in Table 1.

TABLE 1

|  | D [μm] | W [μm] | A [mm$^2$] | V [mm$^3$] | α (V/A) [μm] | Ra [μm] | α/Ra |
|---|---|---|---|---|---|---|---|
| Example 1 | 0.254 | 105 | 432.34 | 0.032 | 0.074 | 0.024 | 3.1 |
| Example 2 | 0.311 | 110 | 421.31 | 0.041 | 0.097 | 0.028 | 3.5 |
| Example 3 | 0.262 | 103 | 438.01 | 0.032 | 0.073 | 0.014 | 5.2 |
| Example 4 | 0.202 | 92 | 464.07 | 0.022 | 0.047 | 0.006 | 7.8 |
| Example 5 | 0.237 | 101 | 503.57 | 0.021 | 0.042 | 0.006 | 7.0 |
| Comparative example 1 | 0.244 | 93 | 461.99 | 0.027 | 0.058 | 0.035 | 1.7 |
| Comparative example 2 | 0.232 | 93 | 460.96 | 0.026 | 0.056 | 0.056 | 1.0 |
| Comparative example 3 | 0.204 | 92 | 463.20 | 0.022 | 0.047 | 0.012 | 3.9 |
| Comparative example 4 | 0.225 | 99 | 447.09 | 0.027 | 0.060 | 0.016 | 3.8 |
| Comparative example 5 | 0.209 | 95 | 456.38 | 0.024 | 0.053 | 0.019 | 2.8 |

<Confirmation of Friction Reduction Effect>

For the manufactured valve lifters of Examples 1 to 5 and Comparative examples 1 to 5, an outer surface of the counterpart member was slid on the sliding surface of the valve lifter using a motoring tester, and torque values were measured when the relative sliding speed with respect to the counterpart member was changed to 0.6, 0.9, 1.4 or 1.7. Table 2 shows relative values of each torque, assuming that a torque value of Comparative example 4 is 1.

TABLE 2

|  |  | relative sliding speed (m/s) | | | |
|---|---|---|---|---|---|
|  | α/Ra | 0.6 | 0.9 | 1.4 | 1.7 |
| Example 1 | 3.1 | 0.82 | 0.87 | 0.96 | 1.00 |
| Example 2 | 3.5 | 0.86 | 0.91 | 0.96 | 0.99 |
| Example 3 | 5.2 | 0.83 | 0.87 | 0.92 | 0.94 |
| Example 4 | 7.8 | 0.81 | 0.86 | 0.93 | 0.96 |
| Example 5 | 7.0 | 0.73 | 0.73 | 0.79 | 0.82 |
| Comparative example 1 | 1.7 | 0.88 | 0.94 | 1.02 | 1.06 |
| Comparative example 2 | 1.0 | 0.92 | 1.00 | 1.12 | 1.17 |
| Comparative example 3 | 3.9 | 0.98 | 1.04 | 1.02 | 1.02 |
| Comparative example 4 | 3.8 | 1.00 | 1.00 | 1.00 | 1.00 |
| Comparative example 5 | 2.8 | 1.04 | 1.00 | 1.02 | 1.01 |

Figure 6:
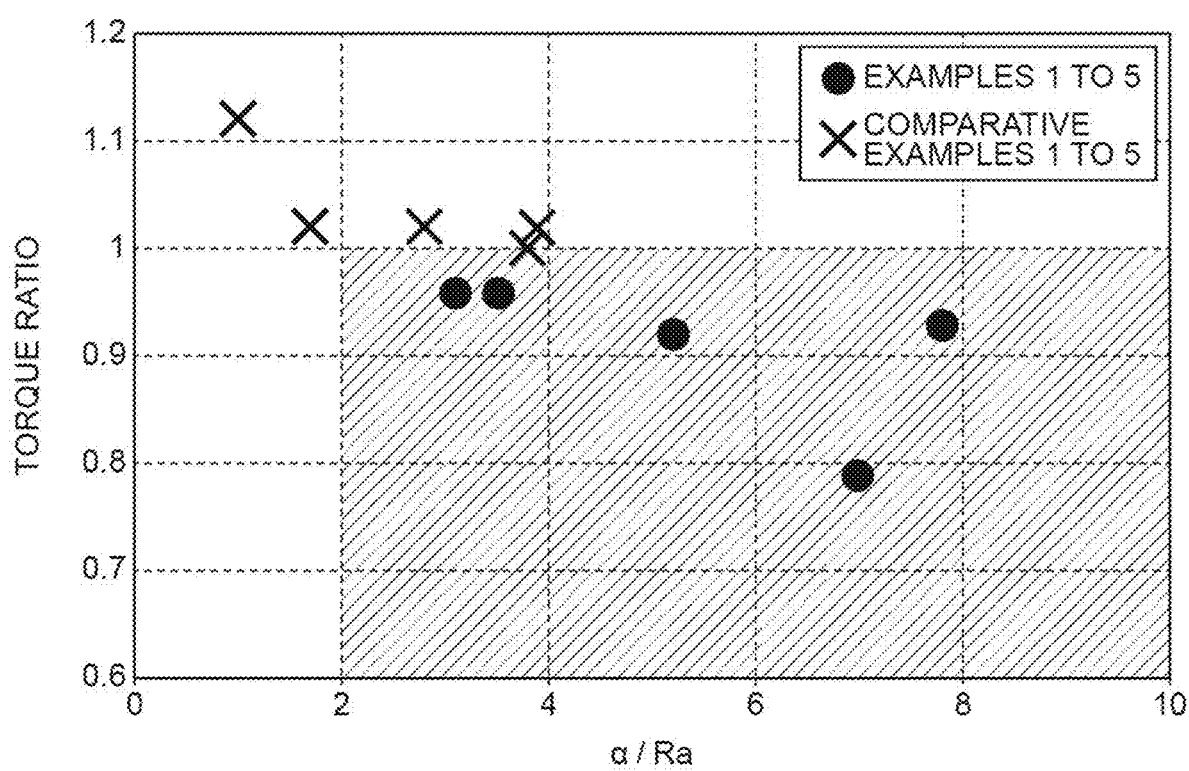
FIG. 6 is a graph showing results of Examples and Comparative examples when used in an environment in which a relative sliding speed with respect to a counterpart member is 1.4 m/s.

The measurement results of Examples 1 to 5 and Comparative examples 1 to 5 at a relative sliding speed of 1.4 m/s are shown in FIG. 6.

REFERENCE SIGNS LIST

11 Sliding surface
16 Spiral groove
17 Annular groove
24 Cam

The invention claimed is:
1. A sliding member used in presence of lubricant oil, comprising:
a sliding surface made of a base material; and
a recess provided in the sliding surface,
wherein the sliding surface satisfies a condition expressed by following equation,

$$2 \leq \alpha/Ra \leq 100,$$

wherein, in the equation, α represents a ratio of a total volume of the recess on the sliding surface to an area of a portion of the sliding surface in which the recess is not formed, and Ra represents a center line average roughness of the sliding surface in the portion in which the recess is not formed.
2. The sliding member according to claim 1, wherein the recess is a spiral groove or a plurality of concentric grooves.
3. The sliding member according to claim 2, wherein the groove has a length L and an average width W, and a ratio L/W of the length L to the average width W is 2 or more.
4. The sliding member according to claim 2, wherein the groove has an average width W and an average depth D, and a ratio W/D of the average width W to the average depth D is greater than 1.

5. The sliding member according to claim 1, wherein the recess is a groove that extends linearly.

6. The sliding member according to claim 1, wherein the recess is a plurality of grooves that extend radially.

7. The sliding member according to claim 6, wherein inner ends of the plurality of grooves extending in a radial direction are separated from each other and are not connected to each other.

8. The sliding member according to claim 1, which is used in an environment in which a relative sliding speed with respect to a counterpart member is 1.4 m/s or less.

* * * * *